(12) United States Patent
Zhao et al.

(10) Patent No.: US 11,036,327 B2
(45) Date of Patent: Jun. 15, 2021

(54) 3D TOUCH

(71) Applicant: Apple Inc., Cupertino, CA (US)

(72) Inventors: Xiao Ying Zhao, Santa Clara, CA (US); Ian A. Spraggs, San Francisco, CA (US); David A. Pakula, San Francisco, CA (US); Tang Y. Tan, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/708,350

(22) Filed: Dec. 9, 2019

(65) Prior Publication Data

US 2021/0072857 A1     Mar. 11, 2021

Related U.S. Application Data

(60) Provisional application No. 62/897,815, filed on Sep. 9, 2019.

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 2203/04101* (2013.01)

(58) Field of Classification Search
CPC .......... G06F 3/041; G06F 3/045; G06F 3/042; G06F 3/043; G01R 27/26; G06K 11/06; G08C 21/00
See application file for complete search history.

(56) References Cited

U.S. PATENT DOCUMENTS

| | | | |
|---|---|---|---|
| 2017/0242524 A1* | 8/2017 | Kim ........................ G06F 3/044 |
| 2018/0039392 A1* | 2/2018 | Kim ........................ G06F 3/0416 |
| 2018/0088702 A1 | 3/2018 | Shutzberg et al. |
| 2018/0088719 A1* | 3/2018 | Huang ................ G02F 1/13338 |
| 2018/0284936 A1 | 10/2018 | Vummidi Murali et al. |
| 2019/0286871 A1* | 9/2019 | Song ..................... G06K 9/2027 |
| 2020/0064952 A1* | 2/2020 | Gupta ..................... G01L 1/142 |
| 2020/0201465 A1* | 6/2020 | Lee ..................... G01L 19/0092 |
| 2020/0209094 A1* | 7/2020 | Park ..................... G06F 1/1684 |
| 2020/0294428 A1* | 9/2020 | Kim ..................... H05K 1/147 |

* cited by examiner

*Primary Examiner* — Pegeman Karimi
(74) *Attorney, Agent, or Firm* — Dorsey & Whitney LLP

(57) ABSTRACT

An electronic device can include a housing and an interface component. The interface component can at least partially define an interface surface, and the interface component and the housing can define an internal volume. A force sensor assembly can be disposed in the internal volume to detect an amount of force applied to the interface surface. The force sensor assembly can include a pressure decay sensor and a gap distance sensor disposed opposite a surface of the interface component.

17 Claims, 10 Drawing Sheets

3D TOUCH

CROSS-REFERENCE TO RELATED APPLICATION(S)

This claims priority to U.S. Provisional Patent Application No. 62/897,815, filed 9 Sep. 2019, and entitled "3D TOUCH," the entire disclosure of which is hereby incorporated by reference.

FIELD

The described embodiments relate generally to electronic devices. More particularly, the present embodiments relate to input components for electronic devices.

BACKGROUND

Electronic devices can include a variety of types of input components that can allow users to interact with the device and perform operations, such input components can include buttons or keys, mice, trackballs, joysticks, touch sensitive components, touch screen displays and combinations thereof. Touch sensitive components, such as touchscreens or touch sensitive displays, in particular, are becoming increasingly popular because of their ease and versatility of operation, as well as their declining price. A touch sensitive display can include a touch sensitive layer disposed over a display layer. A touch sensitive component can allow a user to perform various functions by touching an interface surface using a finger, stylus, or other object at a desired location. In the context of a touch sensitive display, the location can be dictated by a displayed user interface (UI). In general, the touch sensitive component can recognize the occurrence and location of touch inputs, and the electronic device can perform one or more actions in response to the detected inputs.

It can be desirable for the electronic device to detect additional information associated with a touch input to allow a user a wider range of modes of interaction with the device. For example, it can be desirable for the electronic device to be able to distinguish between a "light" or relatively low force touch input and a "hard" or relatively high force touch input at a specific location, and to perform different actions based on which form of input is detected. Typically, however, components for detecting the amount of force exerted on an interface surface of a touch sensitive component can utilize complex and expensive sensor arrays to extend this desired functionality to the entire surface. These expensive arrays can also occupy a large spatial volume inside the electronic device, thereby potentially increasing the size of the device or reducing the space available for components that may provide additional desired functionalities.

SUMMARY

According to some examples of the present disclosure, an electronic device can include a housing, an interface component at least partially defining an interface surface, the interface component and the housing defining an internal volume, and a force sensor assembly disposed in the internal volume to detect an amount of force applied to the interface surface above a threshold, the force sensor assembly including a pressure decay sensor and a gap distance sensor disposed opposite a surface of the interface component.

In some examples, the surface of the interface component and a surface of the gap distance sensor can define a gap, and the gap distance sensor detects a change in a distance of the gap above a threshold. The gap distance sensor can detect a change in a capacitance associated with the gap to detect the change in the distance. The pressure decay sensor can detect an increase in a pressure of the internal volume above a threshold, and an exponential time constant of a rate of decay of the pressure. The amount of force can be detected by a weighted combination of a first signal from the pressure decay sensor and a second signal from the gap distance sensor. A weight of the first signal and a weight of the second signal can be based at least partially on the exponential time constant. The interface component can include a touch sensitive display.

According to some examples, an electronic device can include a housing, an interface component at least partially defining an interface surface, the interface component and the housing defining an internal volume, and a pressure decay sensor disposed in the internal volume to detect an amount of force applied to the interface surface above a threshold.

In some examples, the pressure decay sensor can detect an increase in a pressure of the internal volume above a threshold, and an exponential time constant of a rate of decay of the pressure. The detected amount of force can be based at least partially on the detected exponential time constant. The pressure decay sensor can include a microelectromechanical pressure sensor. The electronic device can further include a secondary sensor disposed in the internal volume, wherein the amount of force is detected by a weighted combination of a first signal from the pressure decay sensor and a second signal from the secondary sensor. A weight of the first signal and a weight of the second signal are based at least partially on the exponential time constant. The secondary sensor can be a gap distance sensor, and an internal surface of the interface component and a surface of the gap distance sensor can define a gap. The gap distance sensor can be a capacitive gap distance sensor. The electronic device can further include a seal between the interface component and the housing. The electronic device can further include an atmospheric pressure sensor. The interface component can include a touch sensing component. The interface component can include a display assembly.

According to some examples, a method for determining an amount of force applied to an interface component of an electronic device having an internal volume can include detecting an increase in a pressure of the internal volume of above a threshold, measuring a rate of decay of the pressure, and determining the amount of force based at least partially on the rate of decay.

In some examples, the method can further include detecting a change in a property of the electronic device above a threshold with a secondary sensor, wherein determining the amount of force includes combining a first weighted value based on the rate of decay with a second weighted value based on the detected change in the property. Additionally, a weight of the first weighted value and a weight of the second weighted value are based at least partially on the rate of decay. Detecting the increase in the pressure can include detecting the increase in the pressure with a pressure decay sensor disposed in the internal volume, and detecting the change in the property can include detecting a change in a capacitance associated with a gap between a surface of the interface component and a gap distance sensor disposed in the internal volume. Determining the amount of force can include comparing the measured rate of decay to a baseline rate of decay, and the method can further include calibrating the baseline rate of decay.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
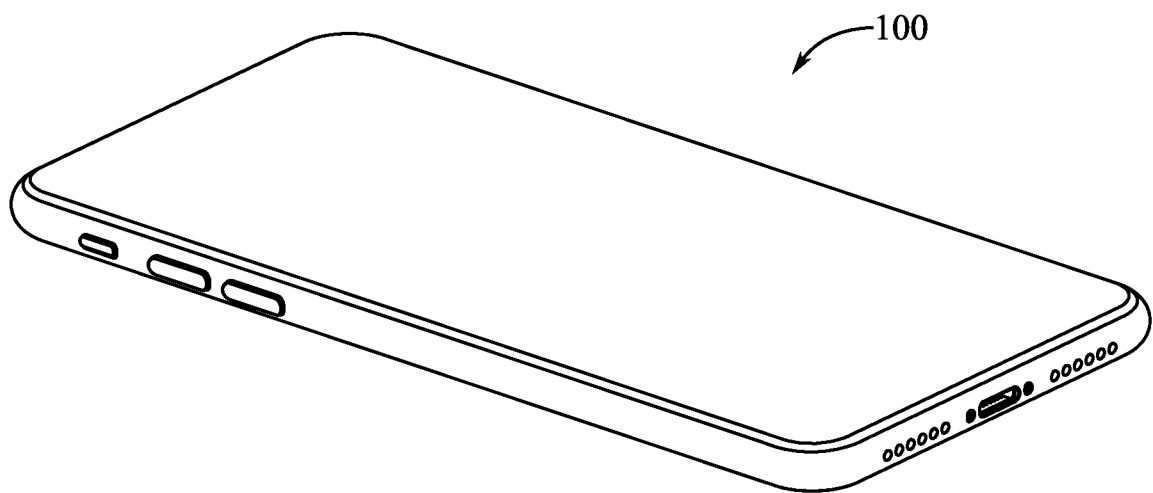
FIG. 1 shows a perspective view of an electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Electronic devices can include interface components that, for example, can include touch sensitive components or touch sensitive interface surfaces. These interface components can detect a location or locations of an input on the interface surface, for example, a touch input by a user. The touch sensitive component can be a touch sensitive display that can display a user interface (UI) and the user can direct the electronic device to perform a desired action or actions by performing a touch input at a specific location on the touch sensitive display, as indicated by the UI. While this device configuration can allow a user to direct the device to perform a wide range of actions, the increasing performance capabilities and number of features of electronic devices can make it desirable to allow the user additional modes for interacting with an electronic device and directing the device to perform desired actions.

One additional manner of directing an electronic device to perform desired action can include detecting not only the location of a touch input, but also the amount of force exerted on, or applied to, the interface surface of a component by a user during the touch input, known as 3D touch detection. In this way, a user can direct a device to perform multiple different actions through a touch input at one or more locations by varying the amount of force applied to the interface surface during the touch input. For example, the UI can display an icon on the interface surface, and a touch input by a user that exerts a relatively low force on the interface surface can direct the device to perform a first action associated with the icon, while a touch input by the user that exerts a relatively high force on the interface surface can direct the device to perform a second, different action associated with the icon. Further, because an interface component, such as a touch sensitive component, can detect touch inputs over the entire interface surface of the component, it can be desirable to be able to detect the amount of force applied during these touch inputs at any location on the interface surface.

Traditional methods and components for detecting the amount of force applied to an interface surface can include disposing an array of components beneath an interface surface, with each component being able to detect the amount of force applied to a relatively small region of the interface surface. Together, however, the entire array of components can allow for force detection over the entire interface surface. This array of components, however, can be costly to manufacture and integrate into a device, and can occupy a relatively high portion of the internal volume of the device, thereby resulting in larger electronic devices, or less space in the device for components that could allow for additional functionalities or performance. Accordingly, it can be desirable to be able to detect an amount of force applied to an interface surface with as few small components as possible. For example, with a component or components that can detect a force location and magnitude without extending the component or components across the entire interface surface.

In some examples, detecting the amount of force applied to an interface surface can be achieved with a pressure decay sensor disposed in the internal volume. This pressure decay sensor can be relatively small and inexpensive, and can be disposed at almost any desired location in the internal volume. This allows for smaller devices or devices that include increased room for additional or larger components, as compared to a device that includes an array of force detecting components. The pressure decay sensor can detect an increase in the pressure of the internal volume that can be attributed to the deflection or deformation of the interface surface when a force is applied thereto, and can further detect the rate of decay of the pressure. The amount of force can be at least partially based on the detected rate of decay.

In some examples, other forms of sensors can be used to detect the amount of force applied to an interface surface, such as a gap distance sensor. A gap distance sensor can detect a change in a distance of a gap between the sensor and a component, such as an interface component, that can occur due to deflection of the interface surface when a force is applied thereto. The sensor can detect the amount of applied force based at least partially on the change in distance, and/or how the distance of the gap changes with time.

In order for the force detecting functionality to provide benefits to a user, it can be desirable to be able to accurately and reliably detect the force without the force detecting sensors producing false positives or providing signals with so much noise that the device does not respond as desired to a user's touch input. In some examples, certain force detecting sensors can perform more reliably, or with less noise, than other force detecting sensors. Accordingly, it can be desirable to include two or more force detecting sensors in an electronic device to provide redundant or complimentary force detection, thereby increasing the reliability and accuracy of the detected force. In some examples, the device can select which sensor to use based on various conditions. In some examples, the device can confirm the amount of force detected by one sensor with the signal from a second sensor.

In some examples, the signals from two or more sensors can be assigned weights and combined to provide a single value for the detected amount of force. The weights assigned to each signal can be based on various conditions, including conditions detected by the sensors themselves, such as the rate of decay detected by the pressure decay sensor. Accordingly, an electronic device that can accurately and reliably detect the amount of force above a threshold applied to an interface surface can be provided without the use of potentially expensive and relatively large arrays of components.

In some examples, an electronic device can include a housing and an interface component, such as a touch sensitive display, affixed to the housing. The interface component can define an interface surface that can at least partially define an exterior surface of the electronic device. Together, the housing and the interface component can at least partially define an internal volume. In some examples, the device can include a seal to at least partially seal the internal volume from the ambient environment, except at one or more desired vent locations therebetween. A pressure decay sensor can be disposed in the internal volume to detect an amount of force applied to the interface surface above a threshold. The pressure decay sensor can detect an increase in a pressure of the internal volume above a threshold and detect a rate of decay of the pressure. The pressure decay sensor can detect the amount of force based at least partially on the detected rate of decay.

The device can further include a secondary sensor disposed in the internal volume to detect a change in a property of the device and/or internal volume. The secondary sensor can be a gap distance sensor that can detect a change in a distance of a gap between the secondary sensor and a component of the device above a threshold, and that can further detect an amount of force based at least partially on the change in distance. One or both of the signals from the pressure decay sensor and the secondary sensor can be selected or combined to detect the amount of force on the interface surface. In some examples, the amount of force can be detected based on a weighted combination of signals from the pressure decay sensor and the secondary sensor. The weighting of the signals can be at least partially based on the rate of decay of the pressure detected by the pressure decay sensor.

These and other examples are discussed below with reference to FIGS. 1-10. However, those skilled in the art will readily appreciate that the detailed description given herein with respect to these Figures is for explanatory purposes only and should not be construed as limiting.

FIG. 1 shows an example, of an electronic device 100. The electronic device shown in FIG. 1 is a mobile electronic device, such as a smartphone. The smartphone of FIG. 1 is merely one representative example of a device that can be used in conjunction with the systems and methods disclosed herein. Electronic device 100 can correspond to any form of a wearable electronic device, a portable media player, a media storage device, a portable digital assistant ("PDA"), a tablet computer, a computer, a mobile communication device, a GPS unit, a remote control device, or other electronic device. The electronic device 100 can be referred to as an electronic device, or a consumer device. Further details of the electronic device are provided below with reference to FIG. 2.

Figure 2:
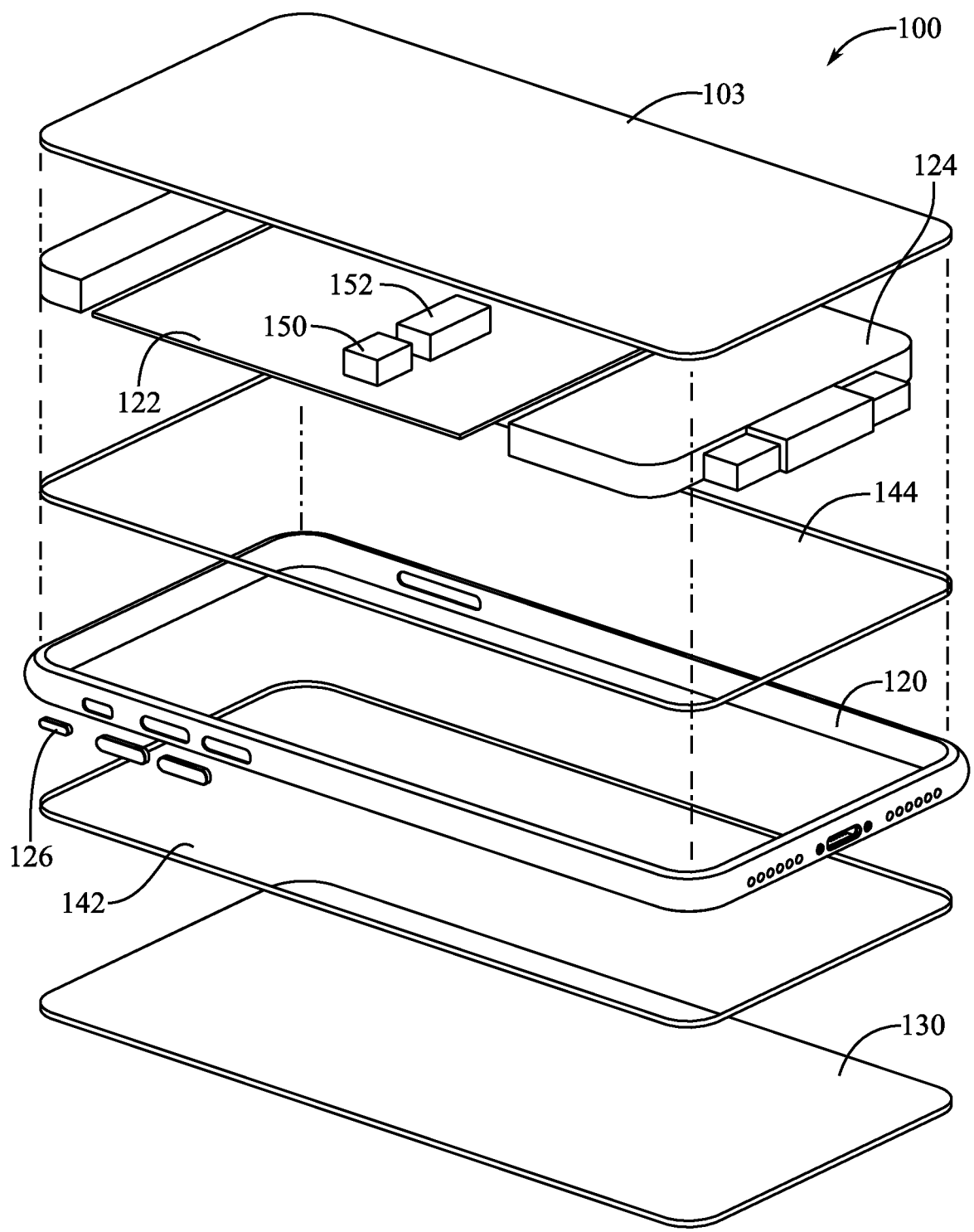
FIG. 2 shows an exploded view of the electronic device of FIG. 1.

FIG. 2 illustrates an exploded view of an electronic device 100. The electronic device 100 can have a housing that includes a band 120 that at least partially defines an exterior portion, such as an outer perimeter, of the electronic device 100. In some examples, the band 120 can include a single unitary or continuous component. In some other examples, however, the band 120 can include multiple portions or sections that can be joined together, for example, by bonding, fusing, adhesives, or combinations thereof. In some examples, the band 120 can include any desired material, such as a metallic material, polymeric material, ceramic material, or combinations thereof.

The housing, including the band 120, can include one or more features to receive or couple to other components of the device 100. For example, the band 120 can include any number of features such as apertures, cavities, indentations, and other mating features to receive and/or attach to one or more components of the device 100. The electronic device 100 can include internal components such as processors, memory, circuit boards, batteries, and sensors. The internal components of the device 100 can include a circuit board 122 that can include a number of electronic components mounted thereon, such as system in package (SiP), including one or more integrated circuits such as a processors, sensors, and memory. The device 100 can also include a battery 124 housed in the internal volume of the device 100. Additional components, such as a haptic engine, can also be included in the device 100. In some examples, the device 100 can also include input components, such as one or more buttons 126. In some examples, a button 126 can be disposed in an opening or aperture defined by the band 120. In some examples, the opening or aperture containing the button 126 can be sealed, such as with an air-tight or water-tight seal, as described herein.

In some examples, the electronic device 100 can include a display assembly 103. The display assembly 103 can be received by, and/or be attached to, the band 120 by one or more attachment features. In some examples, the display assembly 103 can include a display, one or more layers capable of receiving inputs, such as a touch sensitive layer that can determine a location or locations of one or more touch inputs, and a transparent cover that can at least partially define an exterior surface of the device 100. In some examples, the display assembly 103 can be considered an interface component, as described herein. Accordingly, the portion of the display assembly 103 defining the exterior surface of the device can be considered an interface surface and can receive inputs, such as touch inputs from a user.

The exterior surface of the electronic device 100 can further be defined by a back cover 130 that can be coupled to one or more other components of the device 100. In this regard, the back cover 130 can combine with the band 120 and the display assembly 103 to define an internal volume and an exterior surface of the device 100. The back cover 130 can include a transparent material, such as glass, plastic, sapphire, or other similar transparent material. In some examples, the back cover 130 can include any desired material, such as metallic materials, polymeric material, ceramic materials, or combinations thereof.

In some examples, electronic device 110 can include a first sealing material or seal 142. The sealing material 142 can include a compliant material that can effectively seal the band 120 and the back cover 130 together. In some examples, the sealing material 142 can include a polymeric material, such as a rubber material and/or any other material capable of providing an airtight and/or water tight seal between components, such as the band 120 and the back cover 130, as described herein. In some examples, the sealing material 142 can include one or more portions of adhesive and/or glue. In some examples, the sealing material 142 can be disposed at least partially around a periphery of the back cover 130, or at one or more locations where the back cover 130 and the band 120 meet or are substantially adjacent.

Electronic device 100 can further include a second sealing material or seal 144 that can be substantially similar to, and can include some or all of the features of the seal 142 described herein. In some examples, the seal 144 can seal the display assembly 103 to the band 120 of the electronic device 100. Accordingly, the first seal 142 and the second seal 144 can at least partially seal the internal volume defined by the display assembly 103, the band 120, and the back cover 130 from the ambient or external environment. In some examples, the seal provided by the first sealing material 142 and the second sealing material 144 can provide an airtight and/or watertight seal between the internal volume and the ambient environment. Thus, in some examples, changes in the dimensions of the internal volume of electronic device 100 can result in changes in the air pressure, otherwise referred to herein simply as pressure, of the internal volume independent of the pressure of the ambient environment.

In some examples, electronic device 100 can include an opening or a vent that can control the communication between the sealed internal volume of the electronic device 100 and the ambient environment. For example, a vent can control the rate at which air, or any fluid, can pass between the sealed internal volume and the ambient environment, thereby allowing the pressure of the sealed internal volume and the pressure of the ambient environment to equalize on a desired timescale, as described herein.

In addition to the internal components disposed in the internal volume of the device 100, the device 100 can further include one or more sensors disposed in the sealed internal volume. For example, the electronic device 100 can include a pressure sensor 150, also referred to as a pressure decay sensor 150, disposed in the sealed internal volume. In some examples, the pressure decay sensor 150 can detect, measure, and/or monitor the pressure of the internal volume over time, as described further herein. In some examples, changes in the pressure of the internal volume, such changes in pressure over time and/or the rate of change of the pressure, can be used to determine or detect an amount of force applied to an interface surface of the device 100, such as the exterior surface of the display assembly 103.

In some examples, electronic device 100 can further include a secondary sensor 152 disposed in the internal volume. In some examples, the secondary sensor 152 can detect changes in one or more properties of the internal volume and/or electronic device 100. For example, the secondary sensor 152 can include a gap distance sensor. That is, the secondary sensor 152 can detect a distance or gap and/or changes in the distance of the gap between an exterior surface of the sensor 152 and an interior surface of a component of the device 100, such as an interior surface of the display assembly 103. As described further herein, signals from the secondary sensor 152 can be used to at least partially determine an amount of force applied to an interface surface of the device 100, such as an exterior surface of the display assembly 103. Further details of an electronic device 200 including an interface surface, an internal volume, and a pressure decay sensor disposed therein are described below with reference to FIG. 3.

Figure 3:
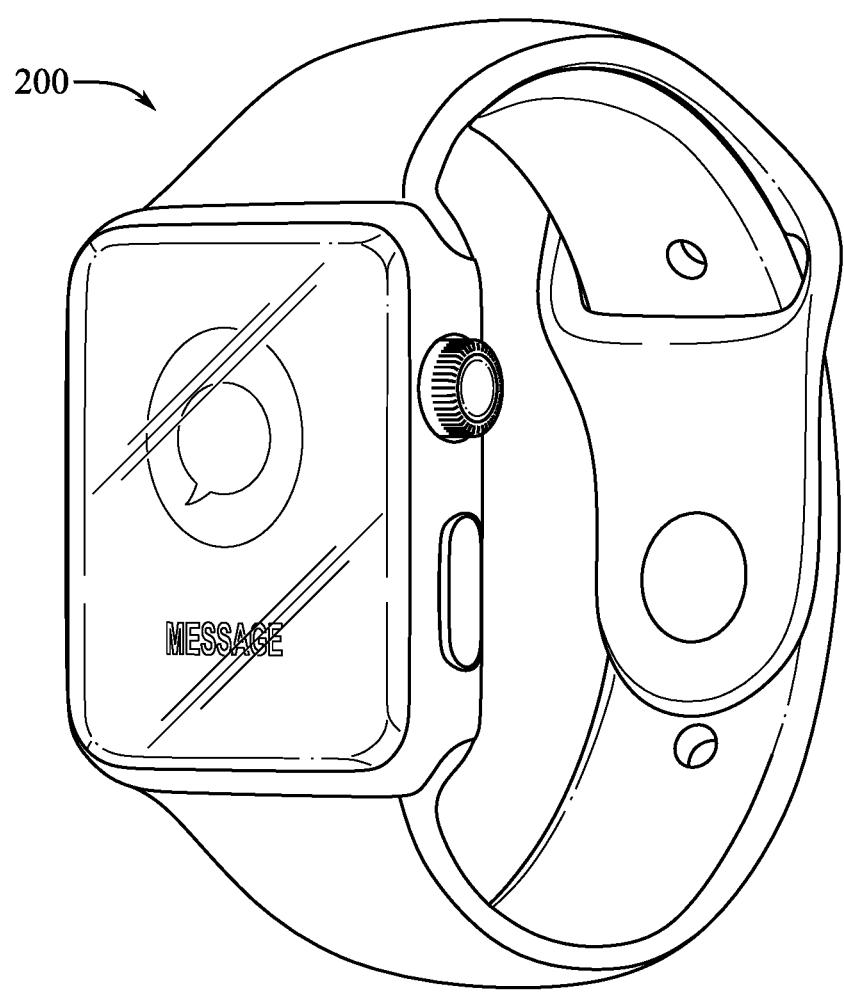
FIG. 3 shows a perspective view of an electronic device.

FIG. 3 shows another example of an electronic device 200. The electronic device shown in FIG. 3 is a watch, such as a smartwatch. The smartwatch 200 of FIG. 3 is merely one representative example of a wearable device that can be used in conjunction with the components and methods disclosed herein. As described with respect to electronic device 100, electronic device 200 can correspond to any form of wearable electronic device, a portable media player, a media storage device, a portable digital assistant ("PDA"), a tablet computer, a computer, a mobile communication device, a GPS unit, a remote control device, and other devices. The electronic device 200 can be referred to as an electronic device, or a consumer device. Further details of the watch 200 are provided below with reference to FIG. 4.

Figure 4:
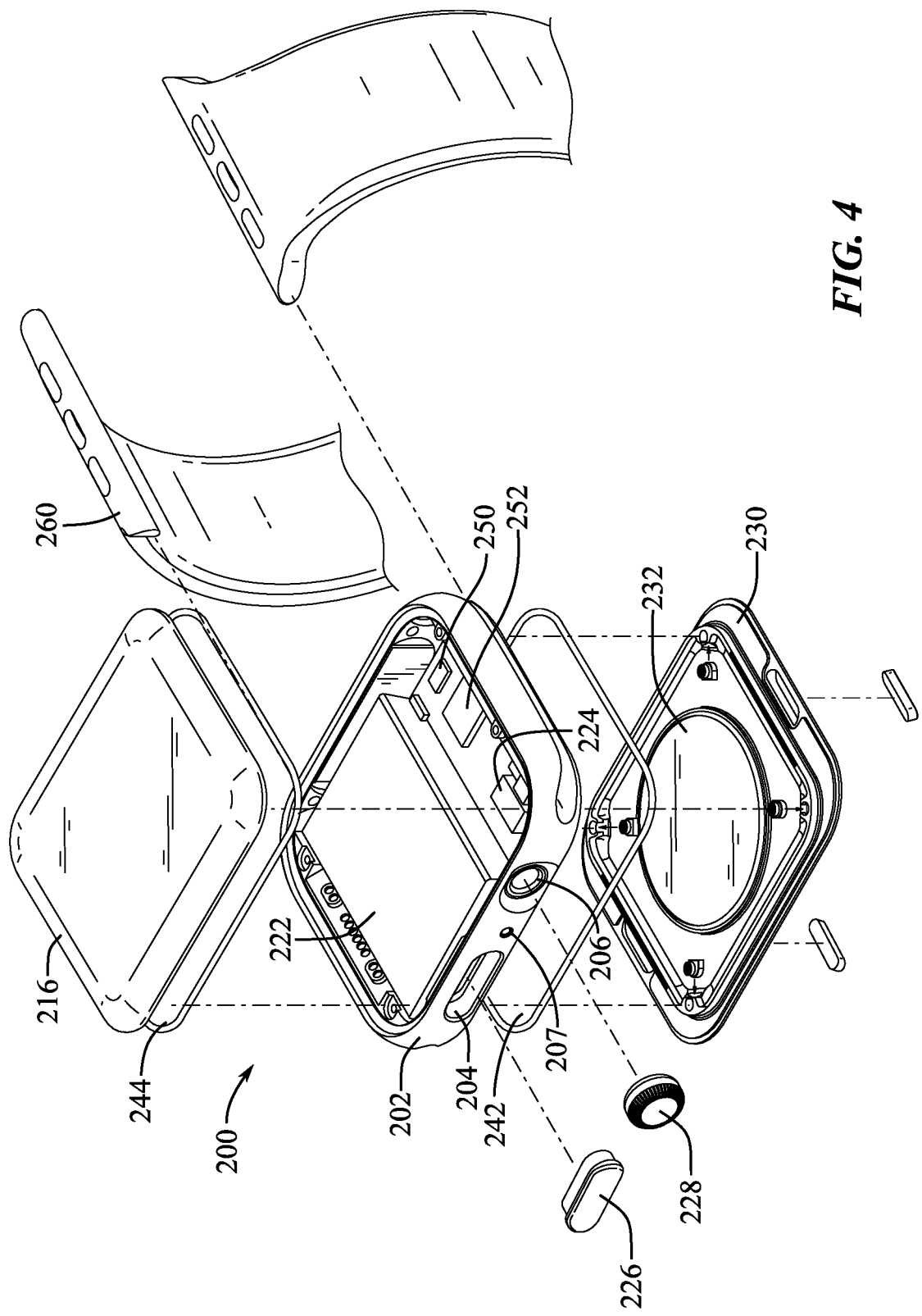
FIG. 4 shows an exploded view of the electronic device of FIG. 3.

Referring now to FIG. 4, the electronic device 200 can include a housing 202, and a cover 216 attached to the housing. The housing 202 can substantially define at least a portion of an exterior surface of the device 200. The cover 216 can include glass, plastic, or any other substantially transparent material, component, or assembly. Although in some examples, the cover 216 can include a material or materials that are not transparent. The cover 216 can cover or otherwise overlay a display, a camera, a touch sensitive surface such as a touchscreen, or other component of the device 200. Accordingly, the cover 216 can be, or can be a part of, an interface component. The cover 216 can define a front exterior surface of the device 200 and, as described herein, this exterior surface can be considered an interface surface. In some examples, the interface surface defined by the cover 216 can receive inputs, such as touch inputs, from a user. A back cover 230 can also be attached to the housing 202, for example, opposite the cover 216. The back cover 230 can include ceramic, plastic, metal, or combinations thereof. In some examples, the back cover 230 can include an electromagnetically transparent portion 232. The electromagnetically transparent portion 232 can be transparent to any desired wavelengths of electromagnetic radiation, such as visible light, infrared light, radio waves, or combinations thereof. Together, the housing 202, cover 216, and back cover 230 can substantially define an internal volume and an external surface of the device 200.

As with electronic device 100, in some examples, electronic device 200 can include a first sealing material or seal 242. The sealing material 242 can include a compliant material that can effectively seal the housing 202 and the back cover 230. In some examples, the sealing material 242 can include a polymeric material, such as a rubber material and/or any other material capable of providing an airtight and/or water tight seal between desired components, such as the housing 202 and the back cover 230. In some examples, the sealing material 242 can include one or more portions of adhesive and/or glue. In some examples, the sealing material 242 can be disposed around a periphery of the back cover 230, or at one or more locations where the back cover 230 and the housing 202 meet or are substantially adjacent.

The electronic device 200 can further include a second sealing material or seal 244 that can be substantially identical to, and include some or all of the features of the seal 242 described herein. In some examples, the seal 244 can seal the cover 216 to the housing 202 of the electronic device 200. Accordingly, the first seal 242 and the second seal 244 can serve to seal the internal volume defined by the cover 216, housing 202, and back cover 230 from the ambient or external environment. In some examples, the seal provided by at least the first sealing material 242 and the second sealing material 244 can provide an airtight and/or watertight seal between the internal volume and the ambient environment, as desired. Thus, in some examples, changes in the dimensions of the internal volume of the electronic device 200 can result in changes in the pressure of the internal volume independent of the pressure of the ambient environment, as described herein.

In some examples, electronic device 200 can include an opening or a vent 207 that can control the communication between the sealed internal volume of the electronic device 200 and the ambient environment. In some examples, the vent 207 can include an aperture defined by the housing 202. In some examples, the vent 207 can include a semi-permeable membrane, valve, or component disposed at the aperture defined by the housing 202. For example, the vent 207 can control the rate at which air or fluid can pass between the sealed internal volume and the ambient environment, thereby allowing the pressure of the sealed internal volume and the pressure of the ambient environment to equalize on a desired timescale, as described herein.

The housing 202 can be a substantially continuous or unitary component, and can include one or more openings 204, 206 to receive components of the electronic device 200 and/or provide access to an internal portion of the electronic device 200. In some examples, the device 200 can include input components such as one or more buttons 226 and/or a crown 228 that can be disposed in the openings 204, 206. In some examples, a material can be disposed between the buttons 226 and/or crown 228 and the housing 202 to provide an airtight and/or watertight seal at the locations of the openings 204, 206.

The electronic device 200 can further include a strap 260, or other component designed to attach the device 200 to a user, or to provide wearable functionality. In some examples, the strap 260 can be a flexible material that can comfortably allow the device 200 to be retained on a user's body at a desired location. Further, the housing 202 can include a feature or features that can provide attachment locations for the strap 260. In some examples, the strap 260 can be retained on the housing 202 by any desired techniques. For example, the strap 260 can include any combination of magnets that are attracted to magnets disposed within the housing 202, and/or retention components that mechanically retain the strap 260 against the housing 202.

The device 200 can also include internal components, such as a haptic engine 224, a battery 222, and a system in package (SiP), including one or more integrated circuits, such as processors, sensors, and memory. The SiP can also include a package. The internal components, such as one or more of components 222, 224 can be disposed within the internal volume defined at least partially by the housing 202, and can be affixed to the housing 202 via internal surfaces, attachment features, threaded connectors, studs, posts, or other features, that are formed into, defined by, or otherwise part of the housing 202 and/or the cover 216 and/or back cover 230.

The device 200 can further include one or more sensors disposed in the sealed internal volume. For example, the electronic device 200 can include a pressure sensor 250, also referred to as a pressure decay sensor 250 disposed in the sealed internal volume. In some examples, the pressure decay sensor 250 can detect, measure, and/or monitor the pressure of the internal volume over time, as described further herein. In some examples, changes in the pressure of the internal volume, such changes in pressure over time and/or the rate of change of the pressure detected by the pressure decay sensor 250 can be used to determine an amount of force applied to an interface surface of the device 200, such as the exterior surface of the cover 216.

In some examples, electronic device 200 can further include a secondary sensor 252 disposed in the internal volume. In some examples, the secondary sensor 252 can detect changes in one or more properties of the internal volume and/or electronic device 200. For example, the secondary sensor 252 can include a gap distance sensor. That is, the secondary sensor 252 can detect a distance of a gap and/or changes in the distance of the gap between a surface of the sensor 252 and an interior surface of a component of the device 200, such as an interior surface of a display assembly or housing 202. As described further herein, signals from the secondary sensor 252 can be used to detect and/or at least partially determine an amount of force applied to an interface surface of the device 200, such as an exterior surface of the cover 216.

Any number or variety of electronic devices defining internal volumes can include any of the sensors described herein. Processes for detecting an amount of force applied to a surface, such as an interface surface of an electronic device, can include detecting an increase in a pressure of the internal volume and detecting a rate of decay of the pressure by any form of pressure decay sensor now known or discovered in the future. The electronic device can also include any form of secondary sensor to detect a change in one or more properties of the device and/or internal volume, for example, a change in a distance of a gap between components of the device. The secondary sensor can provide a detection of the amount of force applied to the interface surface and can be combined with the detection by the pressure decay sensor in any manner desired. Various examples of components, such as sensors, and electronic devices including interface surfaces and internal volumes, as well as methods and components for detecting the amount of force exerted thereon, are described below with reference to FIGS. 5A-7E.

Figure 5A:
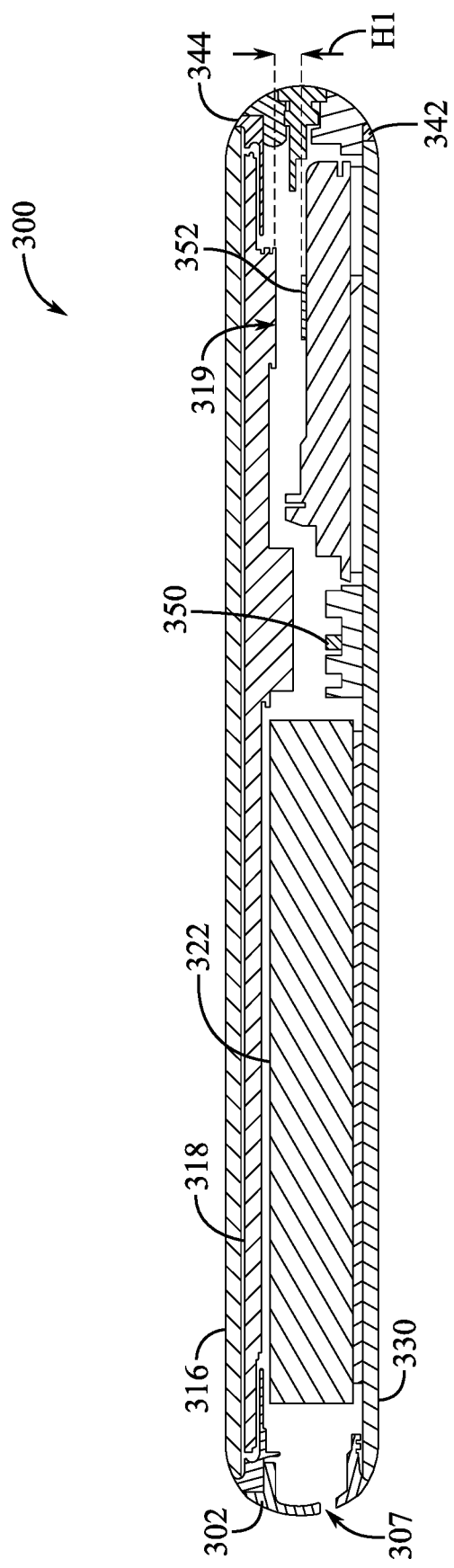
FIG. 5A shows a cross-sectional view of an electronic device.

FIG. 5A shows a cross-sectional view of an electronic device 300. The electronic device 300 can be substantially similar to, and can include some or all of the features of the electronic device 100, 200 described herein with respect to FIGS. 1-4. In some examples, the electronic device 300 can include a housing 302 that can at least partially defined the exterior surface of the electronic device. The electronic device 300 can include a back cover 330 and a transparent cover 316. The back cover 330 can be sealed to the housing 302, for example, with a first sealing material or seal 342 that can include a compliant material disposed between the back cover 330 and the housing 302. The electronic device 300 can further include a second sealing material or seal 344 to seal the transparent cover 316 to the housing 302. Thus, in some examples, the transparent cover 316, housing 302, and back cover 330 can define an internal volume of the electronic device 300. In some examples, this internal volume can be a sealed internal volume and can include a desired level of sealing with respect to the ambient environment.

In some examples, the housing 302 can define an aperture or an opening that can form a vent 307 between the internal volume and the ambient environment. This vent 307 can allow air to pass or flow between the internal volume and the ambient environment at a desired rate. Accordingly, changes in the pressure of the internal volume can revert or decay back to a baseline ambient pressure over a desired timescale, for example, as determined by a level of sealing of the internal volume and a level of communication with the ambient environment facilitated by the vent 307.

As with the electronic devices 100, 200 described herein, the internal volume of the device 300 defined by the housing 302, the back cover 330, and the cover 316 can include one or more components disposed therein. For example, the device 300 can include one or more processors, memory, other electronic components, and/or a battery 322 disposed in the internal volume. In some examples, a pressure decay sensor 350 can be disposed in the internal volume. The pressure decay sensor 350 can detect changes in pressure of the internal volume above a threshold, and can further detect changes in the pressure of the internal volume over time. In some examples, and as described further with respect to FIG. 5B, the rate of change of the pressure of the internal volume from an increased pressure back to a baseline or ambient pressure, as detected by the pressure decay sensor 350, can be used to determine an amount of force applied to a surface of the device, such as the exterior surface defined by the cover 316. In some examples, the pressure decay sensor 350 can include any form of desired air pressure sensor, such as a microelectromechanical (MEMS) pressure sensor, digital pressure sensor, absolute pressure sensor, gauge pressure sensor, differential pressure sensor, capacitive pressure sensor, piezoelectric pressure sensor, electromagnetic pressure sensor, strain-gauge based pressure sensor, potentiometric pressure sensor, optical pressure sensor, resonant pressure sensor, thermal pressure sensor, or combinations thereof.

The electronic device 300 can further include an interface component 318 that can include a display assembly including a touch sensitive layer. In some examples, the interface component 318 and the cover 316 can together define an interface or input component. For example, the interface component 318 can be a touch sensitive display assembly, and together with the cover 316 overlying the touch sensitive display assembly 318, can provide an interface surface whereupon a user can interact with the device 300, such as through touch inputs. Accordingly, an external surface defined by the cover 316 can be considered an interface surface.

In some examples, the electronic device 300 can further include a secondary sensor 352 disposed in the internal volume. In some examples, the secondary sensor 352 can detect changes in one or more properties of the internal volume and/or electronic device 300 above a threshold. In some examples, the secondary sensor 352 can detect changes in a volume of the internal volume and/or changes in the distance between one or more components or portions of components of the device 300 that can correspond to changes in the volume or size of the internal volume. For example, a touch input on an interface surface of the device 300, such as the exterior surface of the cover 316, can cause a deflection of one or more components of the device 300. In these examples, the secondary 352 sensor can detect or measure whether this deflection is above a desired threshold and can measure the deflection with respect to one or more components of the device 300. Accordingly, in some examples, the secondary sensor 352 can be a gap distance sensor that can detect a change in a distance of a gap between portions of the device 300, as described herein.

In some examples, the secondary sensor 352 can detect a change in a distance of the gap between a surface of the sensor 352 and an interior surface of a component of the device 300. For example, as shown in FIG. 5A, the secondary sensor or gap distance sensor 352 can detect a change in the distance (shown as distance H1) of the gap between a surface of the sensor 352 and an interior surface 319 of the display assembly 318. In some examples, the sensor 352 can detect a change in a distance of a gap between a surface of the sensor 352 and surface defined by any component of the device 300. In some examples, the gap distance sensor 352 can be a capacitive gap distance sensor, a time of flight gap distance sensor, or any other sensor able to detect a change in a distance between the sensor and a component of the device 300, as described herein. Further details regarding the operation of the device 300, including the pressure decay sensor 350 and the secondary sensor 352, are described with respect to FIG. 5B.

Figure 5B:
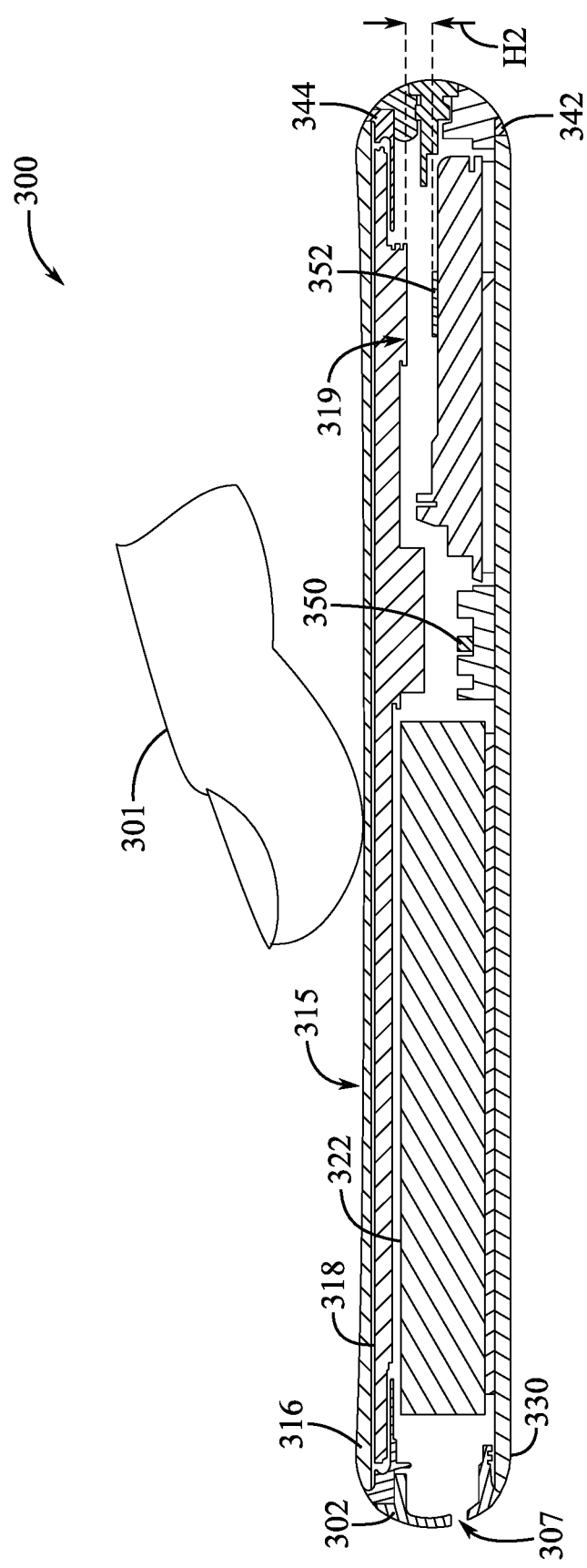
FIG. 5B shows a cross-sectional view of the electronic device of FIG. 5A receiving an input.

FIG. 5B shows the electronic device 300 of FIG. 5A receiving an input from a user 301 on an interface surface 315, for example, the exterior surface of the transparent cover 316 overlying the interface component 318. In some examples, and as described herein, the exterior surface 315 of the cover 316 can be considered an interface surface configured to receive inputs from a user 301. In some examples, these inputs can be touch inputs performed by a user 301. For example, a user 301 can touch a body part, such as a finger, to a desired location on the interface surface 315 overlying a touch sensitive display 318. This input from the user 301 can exert a force on the interface surface 315. In some examples, and as described further herein, the pressure decay sensor 350 and/or the secondary sensor 352 can detect an amount of the force exerted by the user 301 on the interface surface 315, for example, an amount of force applied to the interface surface 315 above a threshold.

In some examples, the force exerted on the interface surface 315 by the user 301 can cause a deflection of components, such as the cover 316 and display assembly 318, disposed below the interface surface 315. This deflection can cause a corresponding change in the volume of the internal volume of the device 300. For example, where the cover 316 deflects inwardly due to a force exerted by a user 301, the internal volume of the device 300 can shrink or can be otherwise compressed. This compression or shrinkage of the internal volume due to the flexion or deformation of the cover 316 and the display assembly 318 can cause a corresponding increase in the pressure of the internal volume. Additionally, because the internal volume can be sealed by sealing components 342, 344 and the flow of air in and out of the internal volume can be controlled by the vent 307, this relatively quick or sharp increase in the pressure of the internal volume can take a relatively long or extended period of time to decay or drop back to ambient or baseline pressure. In some examples, the rate of decay of the pressure of the internal volume to a baseline pressure can be used to at least partially determine the amount of force the user 301 applied to the interface surface 315.

Although the pressure decay sensor 350 is depicted at a specific location in the internal volume of the device 300, in some examples, the pressure decay sensor 350 can be disposed at any location in the internal volume. Further, in some examples, the device 300 can include multiple pressure decay sensors that can be redundant or that can be used in concert to detect the amount of force applied to the interface surface 315 by a user 301. In some examples, the device 300 can further include an atmospheric pressure sensor that is not disposed in a sealed portion of the internal volume, and that can be in direct communication with the ambient environment. In some examples, the atmospheric pressure sensor can be used to detect an ambient or atmospheric pressure, and can compensate for changes in the ambient pressure detected by the pressure decay sensor 350.

Along with the increase in the pressure of the internal volume, the deflection of the cover 316 caused by the force exerted on the interface surface 315 can change the distance of the gap between the interior surface 319 of the interface component 318 and a surface of the sensor 352 disposed below the interior surface 319. Accordingly, the secondary sensor 352, for example, a gap distance sensor 352, can detect that the distance between the surface 319 in the sensor 352 (H1 in FIG. 5A) has changed to a different, smaller distance (indicated as H2 in FIG. 5B). In some examples, the secondary sensor 352 only detects or outputs that the distance H1 has changed to a distance H2 when the difference between H1 and H2 is greater than a desired threshold amount that can be selected or chosen.

In some examples, the secondary sensor 352 can be a capacitive gap distance sensor 352 and can detect a change in a capacitance associated with the distance of the gap between the surface 319 and a surface of the sensor 352. Thus, in some examples, the surface 319 and the surface of the sensor 352 can include conductive materials, and together can form or include a capacitor. In these examples, when the distance of the gap between the surfaces decreases, such as from a value H1 to a value H2, the capacitance associated with the gap can increase an amount corresponding to the difference in distance between H1 and H2. This change in the distance of the gap and/or the time over which the distance change occurs can be used to at least partially detect the amount of force applied to or exerted on the interface surface 315.

In some examples, the secondary sensor 352 can detect a change in the distance of the gap between the surface 319 in the sensor 352 by emitting electromagnetic energy and measuring the time of flight as the emitted energy, such as emitted light, travels from the sensor to the surface 319, and back to the sensor 352. That is, in some examples, the gap distance sensor 352 can be a time of flight sensor. In some examples, the gap distance sensor 352 can emit infrared light and can measure the time of flight of the infrared light beam from the sensor 352 to the surface 319, and back to the sensor 352. In these examples, when the distance of the gap between the surfaces decreases, such as to from a value H1 to a value H2, the time of flight associated with the gap can decrease an amount corresponding to the difference in distance between H1 and H2. In some examples, this change in the distance of the gap and/or the time over which the distance change occurs can be used to at least partially detect the amount of force applied to, or exerted on, the interface surface 315.

Although illustrated at a specific position in the internal volume of device 300, the secondary sensor 352 can be disposed at any desired location in the internal volume. Further, the sensor 352 can measure or detect changes in the distance of a gap between the sensor 352 and any desired component. In some examples, it can be desirable for the secondary sensor 352 to be positioned near a center of an interface surface 315 overlying the sensor 352. This can be because deflections of the interface surface 315 associated with a force applied thereto can be largest near the center of the surface 315, thereby allowing for a more accurate detection of the force by the secondary sensor 352. Further, the distance of the gap between the surface 319 and the sensor 352 can be controlled, as desired. For example, a component such as a shim or a portion of material such as foam, can be disposed on the surface 319, on the sensor 352, and/or below the sensor 352, to control the distance of the gap, as desired.

In some examples, the device 300 can include multiple secondary sensors that can sense changes in the distances of gaps between the sensors and various components of the device 300. In some examples, these secondary sensors can be redundant or can be used in concert or in parallel to detect the amount of force applied to the interface surface 315. In some examples, two or more gap distance sensors can be disposed in line with one another, such that the gap distance sensors can provide multiple signals associated with a change in a distance of the gap between the surface 319 and the sensor closest thereto. In some examples, this sensor configuration can reduce an amount of noise associated with the detection of the change in the distance of the gap.

In some examples, the pressure decay sensor 350 and the secondary sensor 352 can independently detect an amount of force applied to the interface surface 315, for example, an amount of force above a threshold. In some examples, the amount of force detected by the pressure decay sensor 350 and the amount of force detected by the secondary sensors 352 can be compared to confirm an accurate detection of the amount of force. In some examples, the signals provided by the pressure decay sensor 350 and the secondary sensor 352 can be weighted and combined to arrive at a single detected the amount of force. In some examples, either of the amount of force detected by the pressure decay sensor 350 or the amount of force detected by the secondary sensor 352 can be discounted, depending on one or more factors.

Further, the amount of force detected by the pressure decay sensor 350 and/or the secondary sensor 352 can be used in conjunction with additional information detected by other sensors the device 300. For example, where the interface component 318 includes a touch sensitive display, the touch sensitive display can detect a location of a user's 301 touch input on the interface surface 315, while the pressure decay sensor 350 and/or a secondary sensor 352 can be used to detect the amount of the force exerted by the touch input. In some examples, the ability to detect both a location and an amount of force associated with a single or multiple touch inputs can allow for additional modes of interaction with the electronic device 300 by the user 301. For example, a touch input at a specific location on the interface surface 315 having a low force level, below a desired threshold, can cause the device 300 to perform a first action, while a touch input at the specific location on the interface surface 315 having a high force level, above the desired threshold, can cause the device 300 to perform a second, different action. Additionally, in some examples, the use of multiple secondary sensors 352 can allow for multiple different actions associated with multiple different force levels above the threshold. In some examples, the pressure decay sensor 350 and the secondary center 352 can include or be considered a force sensor assembly that can detect the amount of force applied to an interface surface 315. Further details regarding the operation of a pressure decay sensor, a secondary sensor, and a force sensor assembly are described below with reference to FIGS. 6A-6E.

Figure 6A:
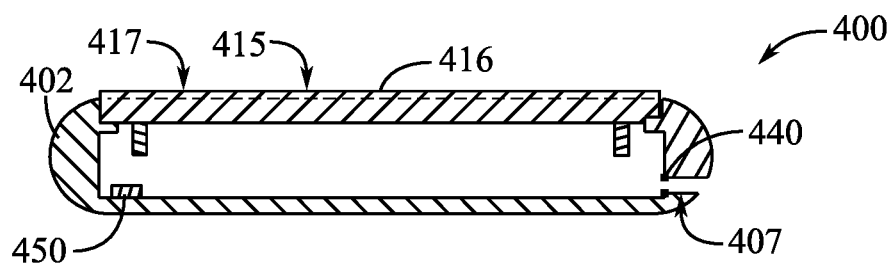
FIGS. 6A-6E show cross-sectional views of an electronic device receiving an input.

FIGS. 6A-6E show cross-sectional views of a user 401 exerting or applying a force on an interface surface 415 of an electronic device 400. The electronic device 400 can be substantially similar to, and can include some or all of the features of the electronic devices 100, 200, 300 described herein with respect to FIGS. 1-5B. As shown in FIG. 6A, the electronic device 400 can include a housing 402 and an interface component 416 affixed to the housing 402 to define an internal volume of the device 400. In some examples, the interface component 416 can include a touch sensitive layer or a component, and can be a touch sensitive display assembly 416. In some examples, however, the interface component 416 can be substantially any component of the device 400 that partially defines an exterior surface and an interior volume of the device 400. As can be seen, the interface component 416 can define an interface surface 415 that can at least partially define the exterior surface of the device 400. The interface component 416 and/or the interface surface 415 can also have a baseline position or configuration 417 that the interface component 416 and/or interface surface 415 can reside in when no force is exerted thereon.

A pressure decay sensor 450 can be disposed in the internal volume defined by the housing 402 and the interface component 416. The housing 402 can also define an aperture or opening 407 that can act as a vent and allow communication between the internal volume and the ambient environment, to a desired level. In some examples, a vent component 440 such as a membrane, valve, or other selectively transmissive component, can be disposed at the opening 407 to control an amount of air flow between the internal volume and the ambient environment. In some examples, the internal volume of the device 400 can be a sealed volume, and the device 400 can include one or more seals to seal the internal volume from the ambient environment at locations other than the opening 407.

Figure 6B:
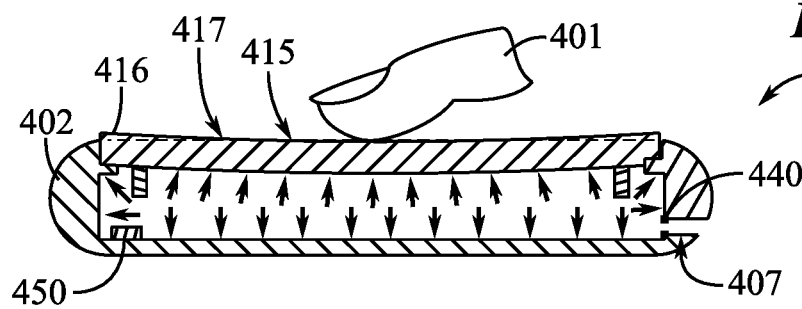

FIG. 6B illustrates an initial contact by a user 401 on the interface surface 415, for example, as can occur during a touch input event. As can be seen, the force applied by the user 401 to the interface surface 415 can cause a deflection, bending, deformation, or other movement of the interface component 416, and can move, bend, deform, or deflect the interface surface 415 out of line with the baseline position 417. This deflection of the interface component 416 also causes a corresponding decrease in the volume of the internal volume of the device 400. As the vent component 440 limits the passage of air between the internal volume and the ambient environment through the opening 407, the reduction in volume associated with the force causes an increase in the pressure of the internal volume, here indicated with outward facing reference arrows. Without being bound by any one theory, the relationship between the pressure of the internal volume and the size of the internal volume can be modelled by Boyle's Law, also known as the Pressure-Volume law, which states that the pressure of an amount of gas at a constant temperature varies inversely with the volume of the amount of gas. Thus, when the volume containing the gas decreases, here the internal volume of the device 400, the pressure of the gas, here the air contained in the internal volume, increases.

Figure 6C:
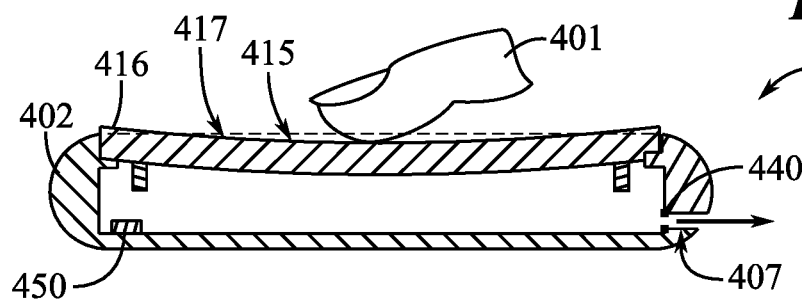

As seen in FIG. 6C, the user 401 has fully applied the force to the interface surface 415, and caused a movement or bending of the surface 415 relative to its baseline position 417. After a duration or time, the increased pressure of the internal volume caused by the applied force can cause some air to escape through the vent 440, as shown with a reference arrow, and the pressure of the internal volume can equalize or decay back to a baseline pressure, for example, an ambient environmental pressure. The internal volume can be effectively or substantially airtight except at the vent 440. In some examples, the vent 440 can control substantially all or most of the air flow into and out of the internal volume, and thus the increased pressure of the internal volume can take a relatively long duration to decay back to a baseline pressure. That is, the pressure of the internal volume can decay back to the baseline at a relatively slow rate, as desired, compared to the rate of pressure increase associated with the applied force.

In some examples, however, the internal volume of the device 400 may not be substantially airtight and may not be effectively sealed at locations between the interface component 416 and the housing 402. In these examples, airflow between the internal volume and the ambient environment can occur at locations other than through the opening 407. In some examples, this relatively lower amount of sealing of the internal volume can be deliberate or can occur by degradation or breakage of sealing components of the device 400 over time. In these examples where the internal volume is not substantially airtight except for the opening 407, the internal pressure can decay to a baseline pressure relatively quickly or at a relatively fast rate compared to a substantially sealed internal volume and/or the rate of increase of the pressure caused by the application of the force.

Figure 6D:
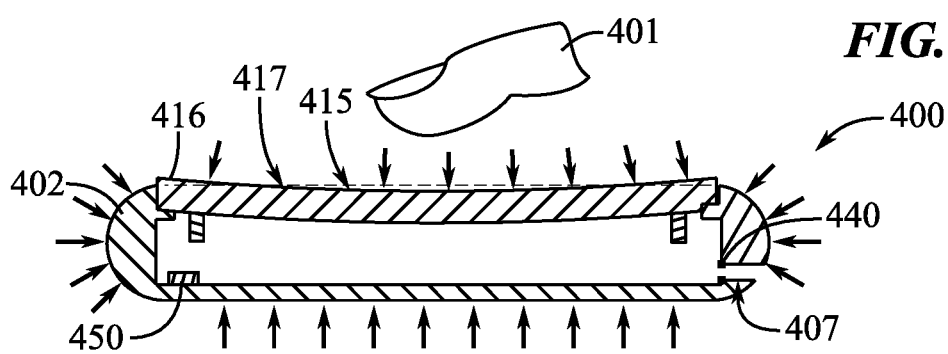

In FIG. 6D, the user 401 has ceased applying the force to the interface surface 415, and the interface component 416 has begun to rebound back to its baseline position 417. In some examples, the interface component 416 can rebound back to its baseline position 417 because of the elastic nature of the deformation or deflection caused by the force applied to the interface surface 415. As the pressure differential between the internal volume and the ambient environment effectively equalized, or at least decreased in FIG. 6C, the removal of the force and subsequent rebound of the interface component 416 can cause an increase in the size or volume of the internal volume of the device 400. In some examples, similar to the manner in which the deformation of the interface component 416 caused an increase in pressure of the internal volume, the rebounding of the interface component 416 back to the baseline position 417 can cause a decrease in the pressure of the internal volume, here shown with reference arrows indicating the relatively higher pressure of the ambient environment as compared to the internal volume.

Figure 6E:
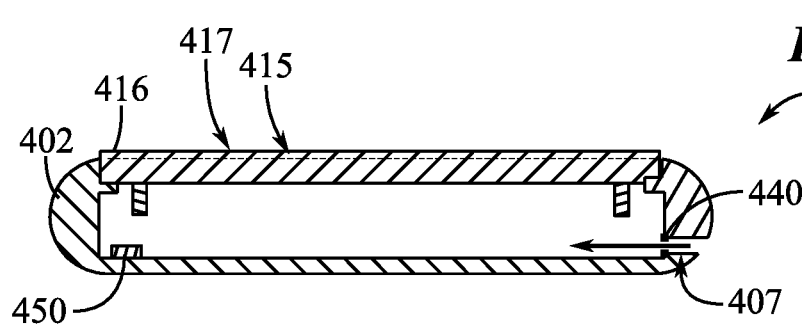

At FIG. 6E, the interface component 416 has fully returned to the baseline position 417 and the pressure of the internal volume has equalized or decayed back to or substantially near to a baseline level, for example, through the transmission of air from the ambient environment into the internal volume through the opening 407 as controlled by the vent 440, here indicated with a reference arrow. As with the transmission of air from the internal volume to the ambient environment described with respect to FIG. 6C, the level of sealing of the internal volume can correspond to an amount of time it takes for the equalization or decay of the pressure of the internal volume to occur, and can correspond to the decay rate of the pressure back to a baseline level. Further details regarding the signals produced by the pressure decay sensor 450 in response to the application of a force and the detection of the amount of force applied to the interface surface 415 by the user 401 are described below with reference to FIGS. 7A-7E.

Figure 7A:
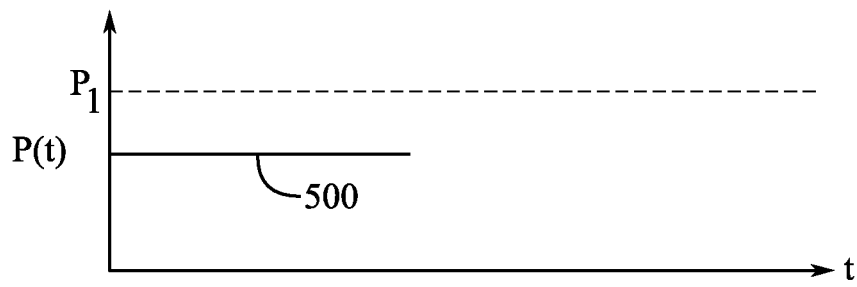
FIGS. 7A-7E show plots of pressure versus time for the internal volume of the electronic device shown in FIGS. 6A-6E.

FIG. 7A illustrates a plot of the pressure 500 (P(t)) of the internal volume of the electronic device 400 illustrated in FIGS. 6A-6E as detected or measured by the pressure sensor 450 versus time (t). The portion of the plot illustrated in FIG. 7A corresponds to the state of the device 400 illustrated in FIG. 6A. That is, FIG. 6A shows the pressure of the internal volume when no force is applied to the interface surface 415 and no deflection of interface component 416 relative to the baseline 417 has occurred. As can be seen, the pressure 500 detected by the pressure decay sensor 450 can be relatively constant because the internal volume of the device 400 remains relatively constant over time.

Figure 7B:
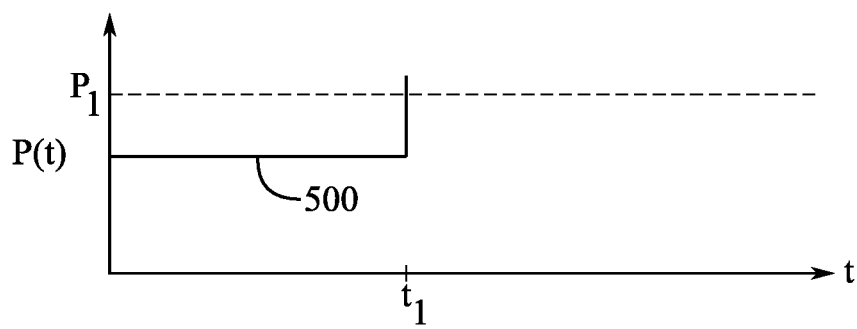

FIG. 7B shows the pressure 500 detected by the pressure sensor 450 at the time ($T_1$) the user 401 begins to apply or exert a force on the interface surface 415 of the device 400, for example, as shown in FIG. 6B. As can be seen, the force exerted on the interface surface 415 is sufficient to cause the pressure 500 detected by the pressure decay sensor 450 to spike or rise above a threshold pressure $P_1$. In some examples, the threshold pressure $P_1$ can be chosen to be any desired pressure value. In some examples, the threshold pressure $P_1$ can be a set value, or can be determined based on one or more factors, such as ambient pressure, level of pressure signal noise, temperature, or combinations thereof. When the pressure decay sensor 450 detects that the pressure 500 has risen above the threshold pressure $P_1$, the pressure decay sensor 450 can detect and/or record the time decay rate of the increased pressure 500. In some examples, when a force applied to the interface surface 415 by user 401 does not cause the pressure 500 to rise above the threshold pressure $P_1$, such as when a user 401 applies a low level of force to the interface surface 415, the pressure decay sensor 450 does not record and/or detect a rate of decay of the pressure 500. Further, in some examples, the pressure decay sensor 450 can measure or detect the time it takes for the pressure to increase due to the applied force, or the rate of increase, and can filter out pressure increases that occur over a time longer than a threshold time or at a rate slower than a threshold rate.

Figure 7C:
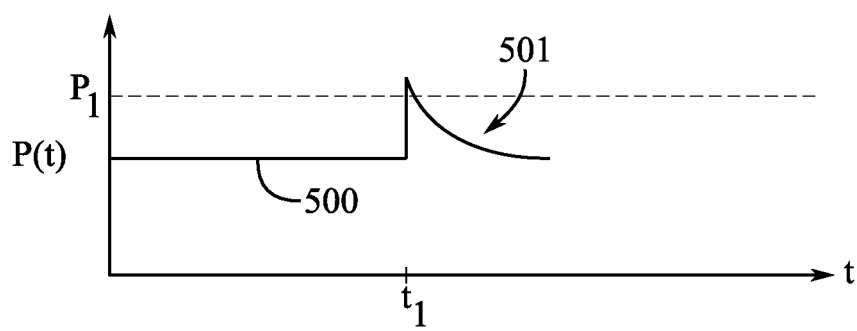

As shown in FIG. 7C, after the application of the force by the user 401 to the interface surface 415 that caused the increase in pressure at time $T_1$, the pressure 500 can begin to decay or equalize back to a baseline pressure, for example, as described with respect to FIG. 6C. In some examples, this decay, here shown as portion 501 of the pressure plot 500, can be mathematically modeled as an exponential decay. That is, the decay or decrease of the pressure 500 at portion 501 over time can be modelled by an equation having the form:

$$P(t)=P_0 e^{-\lambda t}$$

Where $P_0$ can be a constant or function, and $\lambda$ can be considered the decay rate or rate of decay of the pressure 500. Thus, the pressure decay sensor 450 can determine the rate of decay of the pressure 500 of the internal volume. Additionally, in some examples, the pressure decay sensor 450 can detect or determine the exponential time constant ($\tau$) associated with the rate of decay of the pressure 500 at the portion 501. The exponential time constant ($\tau$) can relate to the rate of decay ($\lambda$) according to an equation having the form:

$$\tau=1/\lambda$$

Thus, in some examples, the pressure decay sensor 450 can detect an increase in a pressure 500 of the internal volume of the device 400 above a threshold, and can also detect an exponential time constant of a rate of decay of the pressure 500, for example, back to a baseline, as shown at portion 501. Further, in some examples, the amount of force applied to the interface surface 415 can be proportional to the exponential time constant detected by the pressure decay sensor 450. Accordingly, the pressure decay sensor 450 can detect an amount of force applied to the interface surface 415 based at least partially on the decay rate ($\lambda$) and/or exponential time constant ($\tau$) of the decay of the pressure 500 from an increased pressure of the internal volume caused by the application of the force. In some examples, the detected or determined value of the exponential time constant can help to filter out or disregard interactions with the interface surface 415 by the user 401 where it is not be desirable to detect amount of force based on these interactions or to cause the device 400 to perform an action based on such an interaction.

For example, it can be desirable to detect an amount of force applied to an interface surface 415 by a user 401 only when the user 401 performs a hard push or tap on the surface, and not when the user 401 provides a long, extended, or delayed push or press on the interface surface 415. In these examples, the exponential time constant can at least partially determine whether the user 401 performed a relatively quick or short lived and relatively high force push or tap, as compared to a relatively long or slow press on the interface surface 415, and can communicate with one or more processors of the device 400 to cause the device 400 to perform a desired action according to which manner of interaction the user 401 had with the interface surface 415.

In some examples, the exponential time constant detected by the pressure decay sensor 450 can be related to the performance of the seal between the internal volume and the ambient environment. For example, the lower the exponential time constant detected by the pressure decay sensor 450, the more pathways exist for air to communicate with the ambient environment at locations other than through the vent 440. Similarly, the higher the exponential time constant detected by the pressure decay sensor 450, the fewer pathways exist for air to communicate with the ambient environment at locations other than through the vent 440, thereby indicating a more robust or higher level of sealing of the internal volume of the device 400. In some examples, the pressure decay sensor 450 can detect an amount of force applied to the interface surface 415 of the device 400 above a threshold by detecting an exponential time constant associated with the decay of an increased pressure of the internal volume of the device 400 that is above a threshold exponential time constant.

Figure 7D:
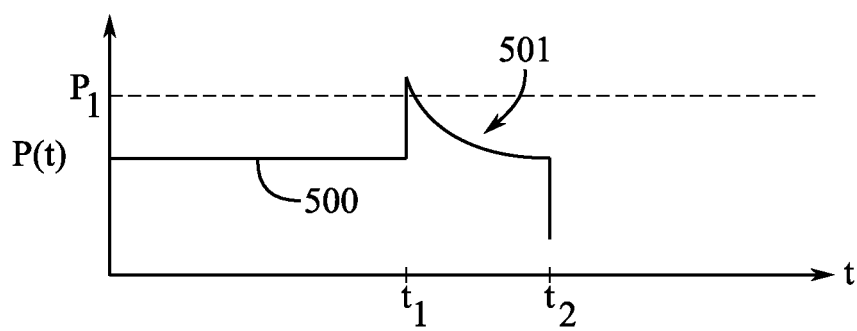

As shown in FIG. 7D, the user 401 has ceased applying a force to the interface surface 415 at time $T_2$, for example, as illustrated in FIG. 6D. The removal of the applied force from the interface surface 415 can cause a rebounding of the deformed or deflected interface component 416 to a baseline position 417, and a corresponding decrease in the pressure 500 detected by the pressure decay sensor 450.

Figure 7E:
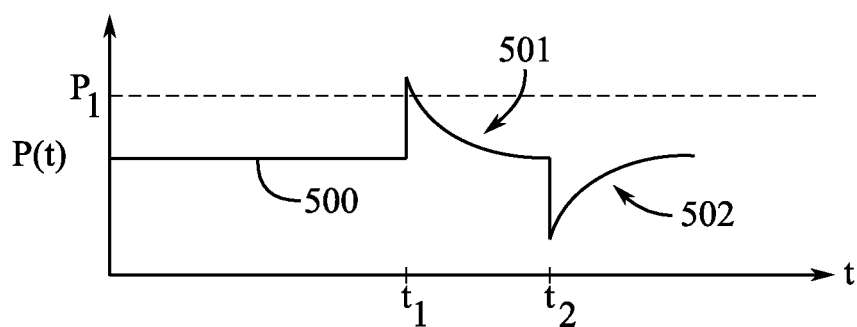

FIG. 7E shows the pressure 500 detected by the pressure decay sensor 450 decaying or returning to a baseline pressure, for example, at portion 502. As described with respect to portion 501 and FIG. 7C, the decay of the pressure at portion 502 can be mathematically modeled as an exponential decay. Accordingly, in some examples, the pressure decay sensor 450 can detect a second rate of decay and a second exponential time constant associated with the portion 502. In some examples, the detected second rate of decay and/or second exponential constant can be used to confirm the amount of force detected based on the exponential time constant associated with portion 501. In some examples, a weighted combination of the first exponential time constant and a second exponential time constant can be used to detect an amount of force applied to the interface surface 415. In some examples, the exponential time constant associated with portion 502 is not used to detect an amount of force applied to the interface surface 415. In some examples the exponential time constant associate with the portion 502 can be used for detecting or determining other properties or performing other functions, such as calibrating the pressure decay sensor 450. Various examples of components, such as sensors, and electronic devices including interface surfaces and internal volumes, as well as methods and components for detecting the amount of force exerted thereon are described below with reference to FIG. 8.

Figure 8:
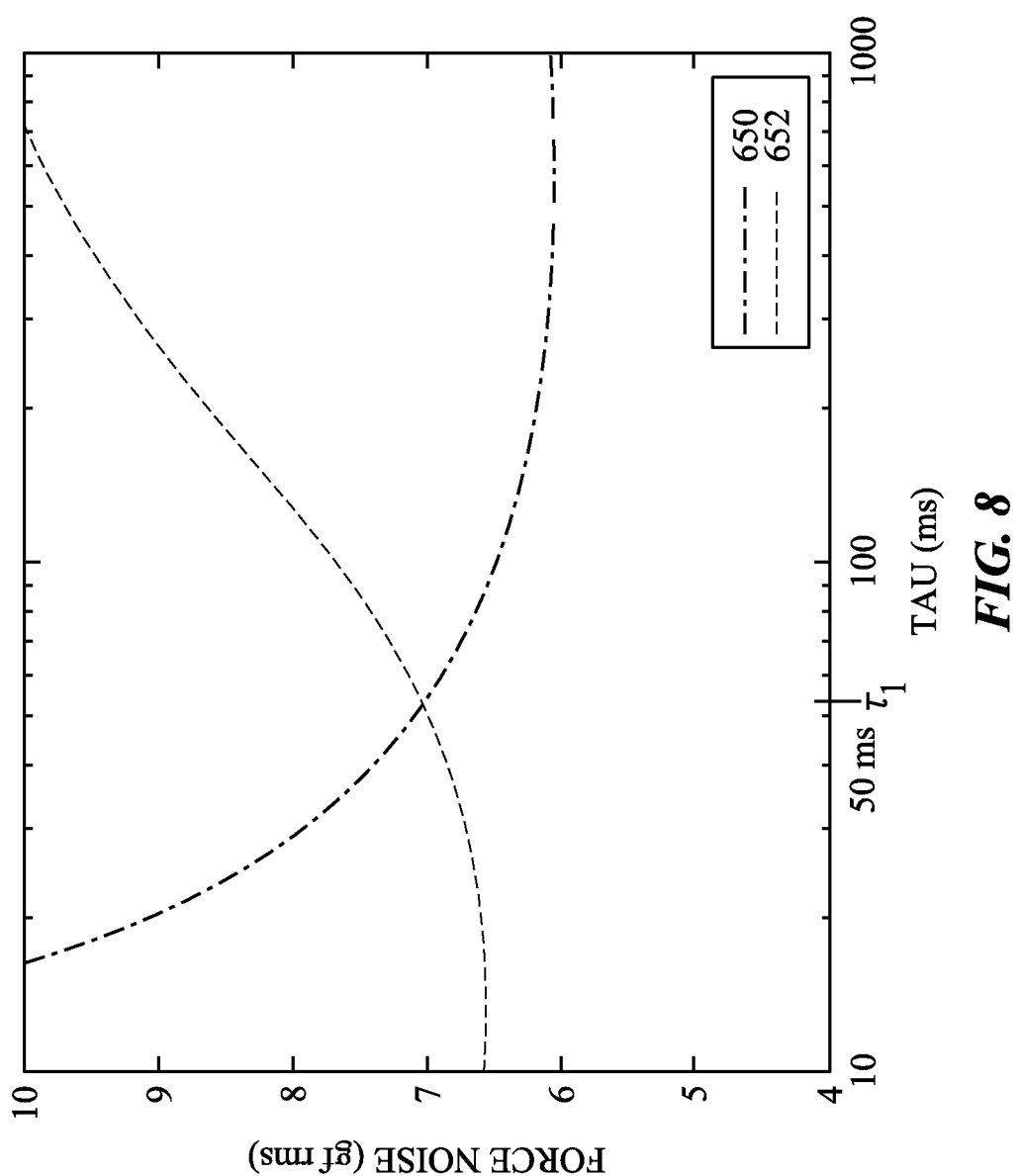
FIG. 8 shows a plot of force noise versus exponential time constant for a sensor.

FIG. 8 shows a plot of the noise associated with the signals corresponding to the amount of force exerted on an interface surface of an electronic device as detected by a pressure decay sensor 650 and a secondary sensor 652 versus the exponential time constant ($\tau$) as detected by the pressure decay sensor 650. In some examples, the interface surface can be substantially similar to, and can include some or all of the features of the interface surfaces described herein, such as interface surfaces 315, 415 described with respect to FIGS. 5A-7E. In some examples, the pressure decay sensor 650 can be substantially similar to, and can include some or all of the features of the pressure decay sensors described herein, such as pressure decay sensors 150, 250, 350, 450. In some examples, the secondary sensor 652 can be substantially similar to, and can include some or all of the features of the secondary sensors described herein, such as secondary sensors 152, 252, 352. In some examples, the secondary center 652 can be a gap distance sensor 652 as described herein, such as a capacitive gap distance sensor.

As can be seen in FIG. 8, the noise level of the signal corresponding to the amount of force detected by the pressure decay sensor 650 generally increases with a decreasing value of the exponential time constant detected by the pressure decay sensor 650. Conversely, the noise level of the signal corresponding to the amount of force detected by the secondary sensor 652 generally decreases with decreasing values of the exponential time constant detected by the pressure decay sensor 650. Accordingly, in some examples, the signal associated with the amount of force detected by the pressure decay sensor 650 can be less noisy, and thus more accurate, than the signal associated with the amount of force detected by the secondary sensor 652 when the exponential time constant detected by the pressure sensor 650 is greater than a value $\tau_1$. In some examples, when the exponential time constant detected by the pressure sensor 650 is less than the value $\tau_1$, the signal associated with the amount of force detected by the secondary sensor 652 can be less noisy and more accurate than the signal associated with the amount of force detected by the pressure decay sensor 650.

In some examples the pressure decay sensor 650 and/or a force sensor assembly including the pressure decay sensor 650 and a secondary sensor 652 can utilize the relationship between the noise levels of signals associated with a detected amount of force and the detected exponential time constant to provide an accurate detection of the amount of force applied to an interface surface.

In some examples, the amount of force detected by the pressure decay sensor 650 and/or a force sensor assembly including the pressure decay sensor 650 and a secondary sensor 652 can be based on either the amount of force detected by the pressure decay sensor 650 or the amount of force detected by the secondary sensor 652. In some examples, the determination of which detected amount of force is used can be based at least partially on the exponential time constant detected by the pressure decay sensor 650. Thus, in some examples, either a signal from the pressure decay sensor 650 or a signal from the secondary sensor 652 can be used to detect the amount of force applied to the interface surface. For example, when the detected exponential time constant is greater than $\tau_1$, the amount of force detected by the pressure decay sensor 650 can be used, while the amount of force detected by the secondary sensor 652 can be used if the exponential time constant is less than $\tau_1$.

In some examples, the amount of force detected by the pressure decay sensor 650 and/or a force sensor assembly can be detected or determined by a weighted combination of the amount of force detected by the pressure decay sensor 650 and the amount of force detected by the secondary sensor 652. In some examples, the detected amount of force can be a weighted combination of a first signal or first detected force from the pressure decay sensor 650 and a second signal or second detected force from the secondary sensor 652, and the weight of the first signal or first detected force and the weight of the second signal or second detected force can be based at least partially on the exponential time constant detected by the pressure decay sensor 650. In some examples, when the exponential time constant is detected to be less than $\tau_1$ the weight assigned to the signal from the pressure decay sensor 650, also referred to as a first weight, can be less than the weight signed to the secondary sensor 652, also referred to as a second weight. In some examples, when the exponential time constant is detected to be greater than $\tau_1$, the weight assigned to the signal from the pressure decay sensor 650 can be greater than the weight assigned to the signal from the secondary sensor 652. In some examples $\tau_1$ can be any desired value or any range of desired values, and can further be selected depending on a number of factors including a previously measured exponential time constant. In some examples, the $\tau_1$ can be between about 0.2 milliseconds (ms) and about 100 ms, or between about 10 ms and about 75 ms, for example, about 40 ms, 50 ms, or 60 ms. In some examples, the first weight or second weight can be assigned increasingly greater values the farther the detected exponential time constant it is from $\tau_1$. In some examples, the relationship between the first weight and/or second weight and the detected exponential time constant can be linear, logarithmic, exponential, or can be related by any function, algorithm, or combination of functions and/or algorithms.

In some examples, the first weight and the second weight can have any desired value or combination of values. For example, the first weight can be between 0% and 100% of the total value of the combined first weight and second weight, while the second weight can also be between 0% and 100% of the total value of the combined first weight and second weight. In some examples, the first weight and second weight can be based entirely on the detected exponential time constant. In some other examples, however, the first weight and or the second weight can be at least partially based on the exponential time constant and any number of additional desired factors or measurements.

In some examples, and as described herein with respect to FIGS. 6A-7E, the performance of the seal between the internal volume of an electronic device and the ambient environment can influence a detected exponential time constant. For example, when there is a relatively high level of sealing between the internal volume and the ambient environment, the detected exponential time constant can be relatively large, such as up to about 2000 ms, or even larger. In some examples, when there is a relatively lower level of sealing between the internal volume and the ambient environment, the detected exponential time constant can be relatively small, such as less than about 100 ms, less than about 60 ms, or even smaller.

In some examples, the level of sealing between the internal volume of an electronic device in the ambient environment can change over the course of a device's lifetime. For example, high stress events, such as accidental drops of the electronic device, can create additional airflow pathways between the internal volume and the ambient environment, thereby resulting in a lower level of sealing and a lower detected exponential time constant. That is, in some examples, the first weight and the second weight can be assigned different values over the course of a device's life. For example, the signal from the pressure decay sensor 650 can be assigned a greater weight than the signal from the secondary sensor 652 when there is a high level of sealing between the internal volume and the ambient environment, but if the level of sealing decreases over the device's lifetime then at some point, such as when he detected exponential time constant is less than $\tau_1$, the weight assigned to the signal from the secondary sensor 652 can be greater than the weight assigned the pressure decay sensor 650.

Any number or variety of electronic devices defining internal volumes can include any of the sensors described herein. Processes for detecting an amount of force applied to a surface, such as an interface surface of an electronic device, can include detecting an increase in a pressure of the internal volume and detecting a rate of decay of the pressure by any form of pressure decay sensor now known or discovered in the future. The electronic device can also include any form of secondary sensor to detect a change in one or more properties of the device and/or internal volume, for example, a change in a distance of a gap between components of the device. The secondary sensor can provide a detection of the amount of force applied to the interface surface and can be combined with the detection by the pressure decay sensor in any manner desired. Various examples of components, such as sensors, and electronic devices including interface surfaces and internal volumes, as well as methods and components for detecting the amount of force exerted thereon are described below with reference to FIGS. 9-10.

Figure 9:
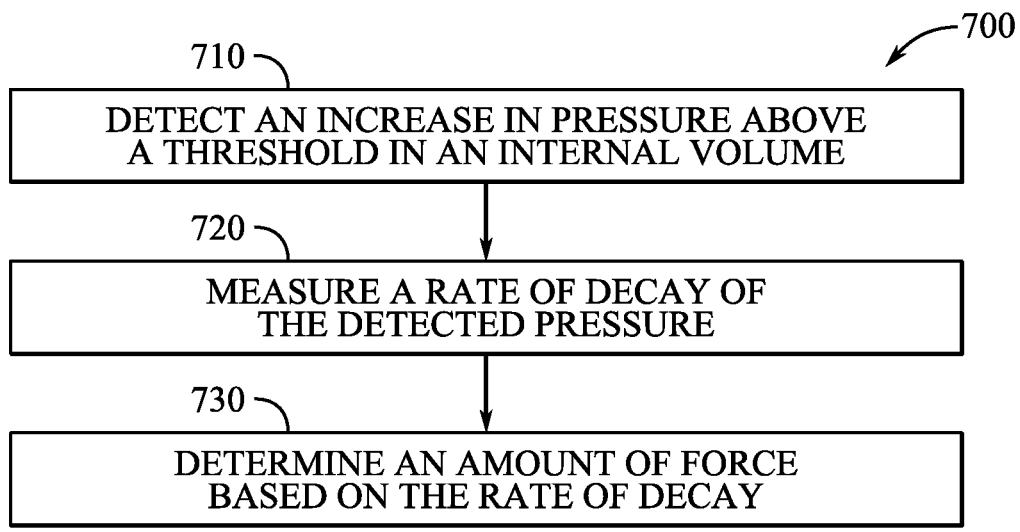
FIG. 9 shows a process flow diagram for a method of determining an amount of force applied to an interface surface of an electronic device.

FIG. 9 illustrates a process flow diagram of a process or method 700 for determining or detecting an amount of force applied to an interface component of an electronic device defining an internal volume. According to FIG. 9, the method 700 for determining the amount of force applied to the interface component can include detecting an increase in a pressure of the internal volume above a threshold at block 710, measuring a rate of decay of the detected pressure of the internal volume at block 720, and determining the amount of force based at least partially on the rate of decay at block 730.

At block 710, an increase in a pressure of the internal volume of electronic device above a threshold is detected. In some examples, the increase in pressure can be detected by a pressure decay sensor, as described herein. In some examples the electronic device can be substantially similar to, and include some or all of the futures of electronic devices 100, 200, 300, 400, while the pressure decay sensor can be substantially similar to, and include some or all of the features of the pressure decay sensors 150, 250, 350, 450 described herein. In some examples, the internal volume of can be at least partially sealed from the ambient environment, such as by a sealing material, as described herein. In some examples, air can travel between the internal volume and the ambient environment in a controlled manner, such as through a vent of the electronic device, as described herein.

At block 720, a rate of decay of the increased pressure can be measured or detected. For example, the rate of decay of the pressure of the internal volume from an increased value back to, or substantially near to, a baseline pressure can be detected by a pressure decay sensor, as described herein with respect to FIGS. 7A-7E. In some examples, measuring the rate of decay of the detected pressure at block 720 can further include measuring or detecting an exponential time constant associated with the detected rate of decay, as described herein.

At block 730, the amount of force applied to the interface component of the device, for example, by a user exerting a force on an interface surface of the interface component, can be determined at least partially based on the rate of decay measured at block 720. In some examples, the amount of force can be determined at least partially by the exponential time constant associated with the rate of decay measured at block at 720. Method 700 can further include detecting a change in a property of the electronic device and/or internal volume above a threshold with a secondary sensor, for example, with a gap distance center, as described herein.

Thus, in some examples, determining the amount of force applied to the interface component can include determining a first amount of force with the pressure decay sensor, for example, based at least partially on a detected exponential time constant, and determining a second amount of force based at least partially on a signal or measurement from the secondary sensor, for example, by detecting a change in the distance of a gap overtime. In some examples, determining the amount of force applied to the interface component can include selecting and outputting one or the other of the first amount of force or the second amount of force. In some examples, determining the amount of force applied to the interface component can include assigning a first weight to the first detected force and a second weight to the second detected force and combining the first weighted detected force with the second weighted detected force. As described herein, for example, with respect to FIG. 8, the first weight and/or second weight can be based at least partially on the rate of decay and/or exponential time constant detected by the pressure decay sensor. Further details of a method 800 for determining an amount of force applied to an interface component of an electronic device having an internal volume are described below with reference to FIG. 10.

Figure 10:
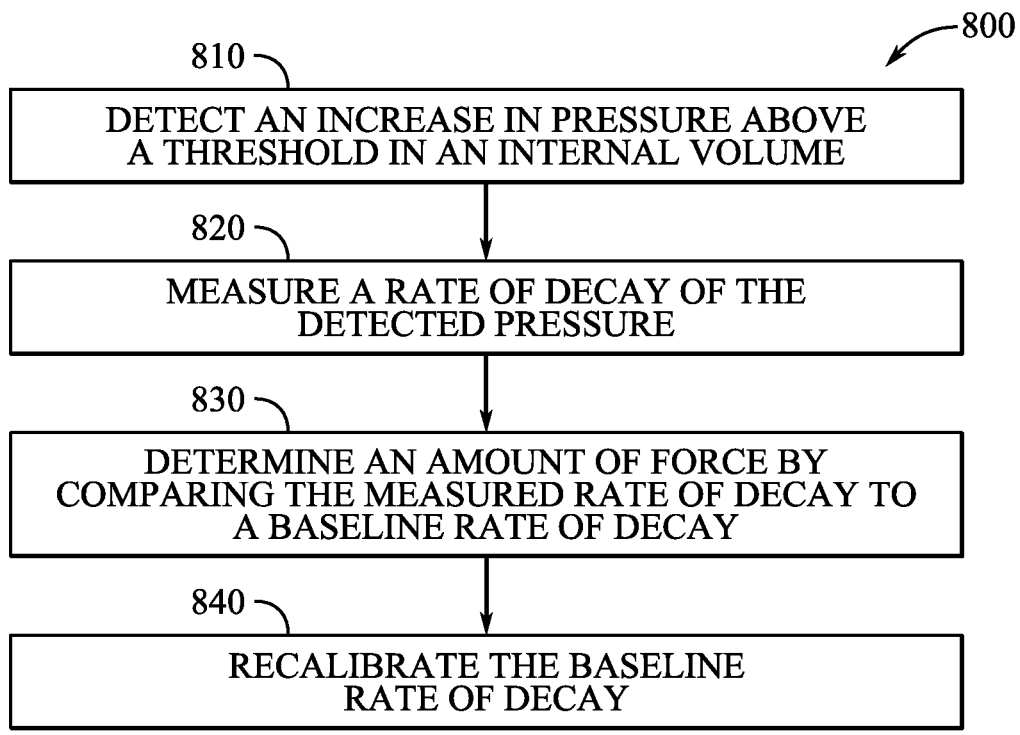
FIG. 10 shows a process flow diagram for a method of determining an amount of force applied to an interface surface of an electronic device.

FIG. 10 illustrates a process flow diagram of a process or method 800 for determining or detecting an amount of force applied to an interface component of an electronic device having an internal volume. According to FIG. 10, the method 800 for determining the amount of force applied to the interface component can include detecting an increase in a pressure of the internal volume above a threshold at block 810, measuring a rate of decay of the detected pressure of the internal volume at block 820, determining the amount of force at least partially by comparing the detected rate of decay to a baseline rate of decay at block 830, and recalibrating the baseline rate of decay at block 840.

At block 810, an increase in a pressure of the internal volume of electronic device above a threshold is detected. In some examples, the increase in pressure can be detected by a pressure decay sensor as described herein. In some examples the electronic device can be substantially similar to, and include some or all of the futures of electronic devices 100, 200, 300, 400, while the pressure decay sensor can be substantially similar to, and can include some or all of the features of the pressure decay sensors 150, 250, 350, 450 described herein. In some examples, the internal volume of can be at least partially sealed from the ambient environment, such as by a sealing material, as described herein. In some examples, air can travel between the internal volume and the ambient environment in a controlled manner such as through a vent of the electronic device, as described herein.

At block 820, a rate of decay of the increased pressure can be measured or detected. For example, the rate of decay of the pressure of the internal volume from an increased value back to or substantially near to a baseline pressure can be detected by a pressure decay sensor, as described herein with respect to FIGS. 7A-7E. In some examples, measuring the rate of decay of the detected pressure at block 820 can further include measuring or detecting an exponential time constant associated with the detected rate of decay, as described herein.

At block 830, the amount of force applied to the interface component of the device, for example, by a user exerting a force on an interface surface of the interface component, can be determined at least partially by comparing the rate of decay measured at block 820 with a baseline rate of decay. In some examples, the amount of force can be determined at least partially by comparing the exponential time constant associated with the rate of decay measured at block at 820 with a baseline exponential time constant. In some examples, the method 800 can further include detecting a change in a property of the electronic device and/or the internal volume above a threshold with a secondary sensor, for example, as described with respect to block 730 of FIG. 9.

At block 840, the baseline rate of decay can be recalibrated or recalculated. In some examples, the rate of decay measured at block 820 can be used as a baseline rate of decay when the pressure decay sensor detects a subsequent increase in pressure above a threshold in the internal volume. In some examples, the detected exponential time constant associated with the rate of decay measured at block 820 can be used to recalibrate the baseline rate of decay or baseline exponential time constant. Thus, in some examples, the baseline rate of decay or baseline exponential time constant discussed with respect to block 830 can be a rate of decay or exponential time constant detected by the pressure decay sensor during a previous iteration of the method 800.

Any of the features or aspects of the devices, components, and methods discussed herein can be combined or included in any varied combination. For example, the design and shape of the devices including a housing and interface component defining an internal volume with a pressure decay sensor disposed therein are not limited in any way and can be formed and operated by any number of processes, including those discussed herein. An electronic device including a pressure decay sensor and one or more secondary sensors, as discussed herein, can detect an amount of force applied to any surface of a device, such as an external surface of a housing or interface component of the device. The device can include any number of internal volumes including any number or type of sensors to detect amounts of forces applied to external surfaces of the components defining the volumes.

To the extent applicable to the present technology, gathering and use of data available from various sources can be used to improve the delivery to users of invitational content or any other content that can be of interest to them. The present disclosure contemplates that in some instances, this gathered data can include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data can be used to provide insights into a user's general wellness or can be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data can be governed by federal and/or state laws, such as the Health Insurance Portability and Accountability Act (HIPAA); whereas health data in other countries can be subject to other regulations and policies and should be handled accordingly. Hence, different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user can be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

As used herein, the terms exterior, outer, interior, inner, top, and bottom are used for reference purposes only. An exterior or outer portion of a component can form a portion of an exterior surface of the component but may not necessarily form the entire exterior of outer surface thereof. Similarly, the interior or inner portion of a component can form or define an interior or inner portion of the component but can also form or define a portion of an exterior or outer surface of the component. A top portion of a component can be located above a bottom portion in some orientations of the component, but can also be located in line with, below, or in other spatial relationships with the bottom portion depending on the orientation of the component.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
   a housing;
   an interface component at least partially defining an interface surface, the interface component and the housing defining an internal volume; and
   a force sensor assembly disposed in the internal volume to detect an amount of force applied to the interface surface, the force sensor assembly comprising:
      a pressure decay sensor to detect an increase in a pressure of the internal volume and an exponential time constant of a rate of decay of the pressure; and
      a gap distance sensor disposed opposite a surface of the interface component, the amount of force being detected by a weighted combination of a first signal from the pressure decay sensor and a second signal from the gap distance sensor;
      wherein a weight of the first signal and a weight of the second signal are based at least partially on the exponential time constant.

2. The electronic device of claim 1, wherein:
   the surface of the interface component and a surface of the gap distance sensor define a gap; and
   the gap distance sensor detects a change in a distance of the gap.

3. The electronic device of claim 2, wherein the gap distance sensor detects a change in a capacitance associated with the gap.

4. The electronic device of claim 1, wherein the interface component comprises a touch sensitive display.

5. The electronic device of claim 1, further comprising a seal between the interface component and the housing.

6. The electronic device of claim 1, further comprising an atmospheric pressure sensor.

7. The electronic device of claim 1, wherein the interface component comprises a touch sensing component.

8. The electronic device of claim 1, wherein the interface component comprises a display assembly.

9. An electronic device, comprising:
   a housing;
   an interface component at least partially defining an interface surface, the interface component and the housing defining an internal volume;
   a pressure decay sensor disposed in the internal volume to detect an amount of force applied to the interface surface; and
   a secondary sensor disposed in the internal volume, the amount of force being detected by a weighted combination of a first signal from the pressure decay sensor and a second signal from the secondary sensor, a weight of the first signal and a weight of the second signal based at least partially on an exponential time constant of a rate of decay of the pressure detected by the pressure sensor.

10. The electronic device of claim 9, wherein the pressure decay sensor detects an increase in a pressure of the internal volume.

11. The electronic device of claim 9, wherein the detected amount of force is based at least partially on the detected exponential time constant.

12. The electronic device of claim 9, wherein the pressure decay sensor comprises a microelectromechanical pressure sensor.

13. The electronic device of claim 9, wherein:
   the secondary sensor comprises a gap distance sensor; and
   an internal surface of the interface component and a surface of the gap distance sensor define a gap.

14. The electronic device of claim 13, wherein the gap distance sensor comprises a capacitive gap distance sensor.

15. A method for determining an amount of force applied to an interface component of an electronic device having an internal volume, comprising:
   detecting an increase in a pressure of the internal volume;
   measuring a rate of decay of the pressure;
   determining the amount of force based at least partially on the rate of decay; and
   detecting a change in a property of the electronic device above a threshold with a secondary sensor, wherein:
      determining the amount of force comprises combining a first weighted value based on the rate of decay with a second weighted value based on the detected change in the property; and
      a weight of the first weighted value and a weight of the second weighted value are based at least partially on the rate of decay.

16. The method of claim 15, wherein:
detecting the increase in the pressure comprises detecting the increase in the pressure with a pressure decay sensor disposed in the internal volume; and
detecting the change in the property comprises detecting a change in a capacitance associated with a gap between a surface of the interface component and a gap distance sensor disposed in the internal volume.

17. The method of claim 15, wherein:
determining the amount of force comprises comparing the measured rate of decay to a baseline rate of decay; and
the method further comprises calibrating the baseline rate of decay.

\* \* \* \* \*